(12) United States Patent
Webb

(10) Patent No.: US 8,718,601 B1
(45) Date of Patent: May 6, 2014

(54) CELLULAR FUEL PUMP, SYSTEMS, AND METHODS OF FUELING

(71) Applicant: Ronald Michael Webb, Elk Mound, WI (US)

(72) Inventor: Ronald Michael Webb, Elk Mound, WI (US)

(73) Assignee: U-Fuel, Inc., Las Vegas, NV (US)

( * ) Notice: Subject to any disclaimer, the term of this patent is extended or adjusted under 35 U.S.C. 154(b) by 0 days.

(21) Appl. No.: 13/691,323

(22) Filed: Nov. 30, 2012

(51) Int. Cl.
*H04M 11/00* (2006.01)
(52) U.S. Cl.
USPC .................. 455/406; 455/456.3; 705/14.38
(58) Field of Classification Search
USPC ............... 455/406, 456.3, 552.1; 705/14.38, 705/14.53, 14.65, 27.1, 43
See application file for complete search history.

(56) References Cited

U.S. PATENT DOCUMENTS

| 6,360,141 | B1 | | 3/2002 | Jensen | |
|---|---|---|---|---|---|
| 7,039,389 | B2 | * | 5/2006 | Johnson, Jr. .................. | 455/406 |
| 7,774,231 | B2 | * | 8/2010 | Pond et al. ...................... | 705/15 |
| 2003/0158891 | A1 | * | 8/2003 | Lei et al. ...................... | 709/203 |
| 2006/0224470 | A1 | * | 10/2006 | Garcia Ruano et al. ........ | 705/27 |
| 2008/0235105 | A1 | * | 9/2008 | Payne et al. .................... | 705/26 |
| 2010/0332389 | A1 | * | 12/2010 | Al-Sahli ........................ | 705/43 |
| 2013/0006776 | A1 | * | 1/2013 | Miller et al. ................ | 705/14.65 |

FOREIGN PATENT DOCUMENTS

EP        1 168 257        2/2002

* cited by examiner

*Primary Examiner* — Ping Hsieh
(74) *Attorney, Agent, or Firm* — Anthony J. Bourget

(57) ABSTRACT

A fuel pump having a unique cellular telephone calling number operable in response to receiving a cellular message. The pump includes a cellular phone component and may include a SIM card slot and SIM card. A number of pumps may each be equipped with a cellular phone component each having a unique calling number and a cellular phone system provider configured to authorize sending of information representing a pre-authorized amount of fuel to be dispensed as a wireless cellular signal to one or any of the pumps. A method of selling fuel includes sending a cellular telephone signal to a unique telephone number associated with the fuel pump and assessing a charge to the cellular telephone of a user prior to authorizing the sending of the signal.

31 Claims, 5 Drawing Sheets

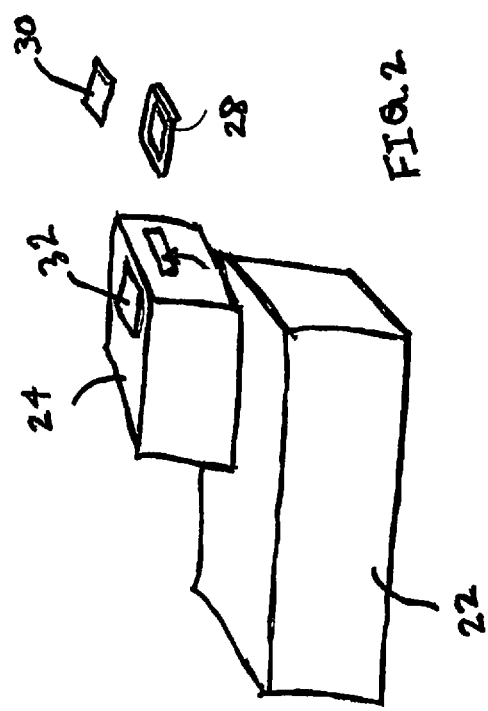
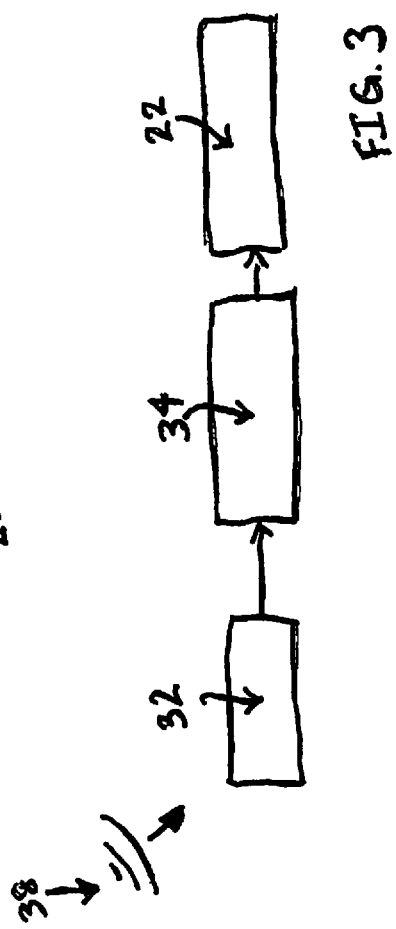

CELLULAR FUEL PUMP, SYSTEMS, AND METHODS OF FUELING

BACKGROUND OF THE INVENTION

1. Field of the Invention

The present invention relates to a fuel pump or service facility that receives communication for dispensing operations.

2. Background Information

There have been fueling systems claimed to have been established that do not require the installation or use of card reading units for the dispensing fuel. One such system is shown in U.S. Pat. No. 6,360,141 to Jensen. The patent to Jensen shows a system that has aspects activated by wireless signals transmitted from a mobile telephone. While the Jensen system may have useful features, there is room for improvement.

PARTIAL SUMMARY OF THE INVENTION

Although fueling systems that include features operable via wireless telephone signals are known, the inventor has realized deficiencies with such systems and has developed improvements thereon. For example, the pump shown herein includes a cellular phone component which allows the pump to possess a unique calling number that may be accessed or controlled by a cellular telephone signal. The cellular phone component is electrically connected to the circuitry of a pump. This provides ease of use for fuel dispensing and substantially reduces the costs of establishing such a system. Users can conveniently pay for fuel, and a fuel pump or station can more readily provide fuel given the lower cost of equipment, operation and administration. A method of facilitating the purchase of fuel includes assessing a charge to the cellular telephone (for instance by debiting pre-paid minutes, reducing credit, billing a user or the like) and authorizing the sending of a cellular telephone signal to a unique telephone number associated with the fuel pump which will dispense the requested value/volume of fuel. Assessing a charge by use of the telephone or an account associated with a telephone provides easier access for consumers while easing payment collection (and collection of services fees) by a provider.

In accordance with an aspect of the invention, an improved fuel pump comprises a traditional pump having a controller where the controller is equipped with a cellular telephone component and having a unique cellular telephone calling number. In further aspects the component includes a SIM card slot and/or SIM card. In further aspects the component includes a cell phone interface configured to convert cellular telephone electrical signals into fuel pump electrical signals.

In a systems aspect, a cellular phone system provider is configured to authorize the sending of information representing a pre-authorized amount of fuel to be dispensed as a wireless cellular signal to a fuel pump having a cellular phone component connected to pump controller, the phone component having a unique calling number configured to receive the wireless cellular signal.

In a method aspect, purchase of fuel is facilitated by assessing a charge to a cellular telephone in an amount representing a value/volume of fuel to be dispensed and authorizing the sending of a cellular telephone signal to a unique telephone number associated with the fuel pump. The fuel pump is equipped with a cellular phone component capable of receiving cellular control signals.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 2 is a perspective view of exemplary components of the pump of FIG. 1.

FIG. 3 illustrates a schematic view of further exemplary components of the pump of FIG. 1.

Figure 1:
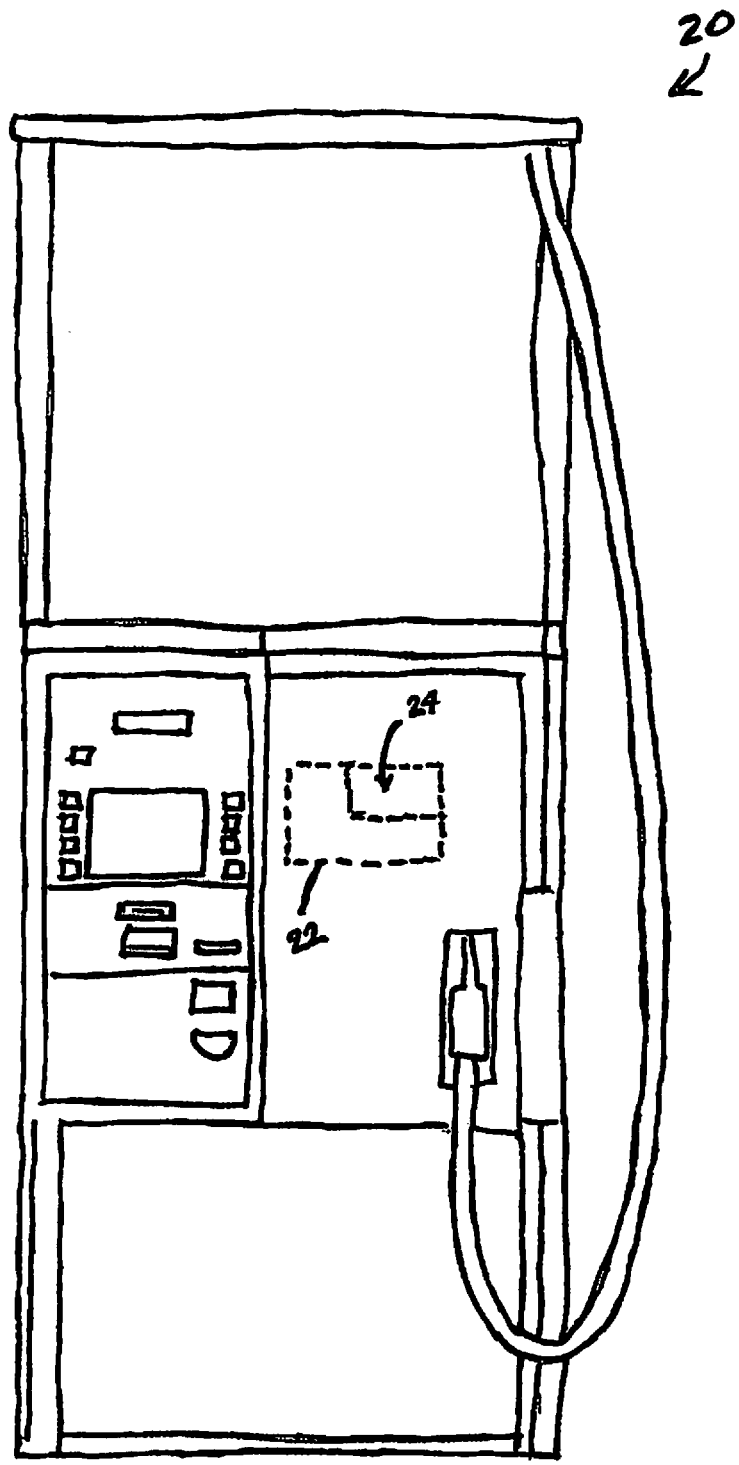
FIG. 1 illustrates an elevation view of an exemplary fuel pump in accordance with an aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-8, aspects of the pump, system, and methods of fueling are shown. FIG. 1 shows fuel pump 20 which may be used to dispense fuel such as gasoline, diesel or other fuel. Pump 20 or variations thereof may also be used to pump a variety of fuels, such as aviation fuel, propane, or other fuels as desired.

Fuel pump 20 includes a controller 22 which is used to control the workings of pump 20. For example, controller 22 interacts with meters, sensors, and solenoid valves to determine the meter flow measurements associated with meters and other equipment traditionally used in pumping operations. The meters, solenoid valves and sensors are contained electronically within the pump and typically connected to piping that leads from a fuel storage tank 50 to a pump hose. Pump 20 includes a pump to transport fuel. Fuel is delivered to a hose and through a nozzle and into a customer's vehicle, motorcycle, moped, boat, airplane or other fuel consuming machine, device or receptacle. Controller 22 may interface with payment systems to receive payment information for transaction processing. For instance, controller 22 may interface with traditional keypads, magnetic strip card readers/scanners for insertion of credit, debit or other magnetic strip cards for payment, or with other transaction processing equipment. Several of such payments systems, however, are expensive and are not practical for use in every case.

As shown for example in FIG. 2, a cellular phone component 24 is connected to controller 22. Component 24 is electrically connected to controller 22. Component 24 may be contained within controller 22 or may be appended or connected to controller 22. Component 24 may be integrated with the circuitry of controller 22 and may include elements that share the same circuit board or other elements. Cellular phone component 24 exhibits or possesses a unique calling number. In one example, cellular phone component 24 includes features of the GSM (Global System for Mobile Communications) type and may be compatible for receiving/sending signals associated with the GSM cellular network. In one instance, component 24 may include a cellular telephone of GSM compatibility connected to controller 22. Additional or different digital cellular technologies may also be used. While component 24 need not comprise an entire cellular telephone (i.e., component 24 need not contain keys and/or speaker and/or camera or other features), use of a cellular telephone or smart phone as component 24 is not precluded. Component 24 may comprise a cellular telephone. Applicant appreciates that not all parts of a cellular telephone may be required for operation herein, and thus particular components of a traditional cellular telephone may be lacking from component 24.

In one aspect component 24 is electrically connected directly to controller 22 by securing an electrical wire from the circuitry of component 24 to the circuitry of controller 22. In a further instance, component 24 may be positioned on the same circuitry or circuit board as controller 22. In a further instance, component 24 may include an electrical plug to insert into a companion plug associated with controller 22 to maintain electrical connection therebetween. In this manner component 24 may be easily removed/replaced from controller 22. In further aspects a component 24 may be retrofitted into or onto a pre-existing controller 22. In yet further aspects controller 22 may be retrofitted to receive component 24. Controller 22 may also be configured to contain all elements of component 24.

In one aspect component 24 includes a SIM card slot 26. Slot 26 is configured to receive a SIM card 30. In one aspect SIM card 30 may be placed on a SIM card tray 28 and inserted into slot 26. As may be appreciated SIM card 30, i.e., a Subscriber Identity Module card, is a small removable smart card that is used in many cellular telephones to store data such as a customer's or telephone's unique mobile phone number, the mobile phone company used by the customer (i.e. ATT, Verizon, etc.), address book information, among other data. SIM card 30 may be removed and replaced with a different SIM card 30 to effectively change the unique calling telephone number of component 24. In this manner, fuel pump 20 and component 24 may be used in a variety of different countries and still be compatible for use in operation. Particularly, a SIM card 30 that is configured for use in the United States (or other country) for example may be removed and replaced with a SIM card 30 that is operational in, for instance, Indonesia (or other country) for example, without having to reconfigure the circuitry of component 24 or controller 22. It may be appreciated, however, that such circuitry may be hard-wired and/or programmed, if desired, to operate with a single non-changeable calling number.

Figure 5:
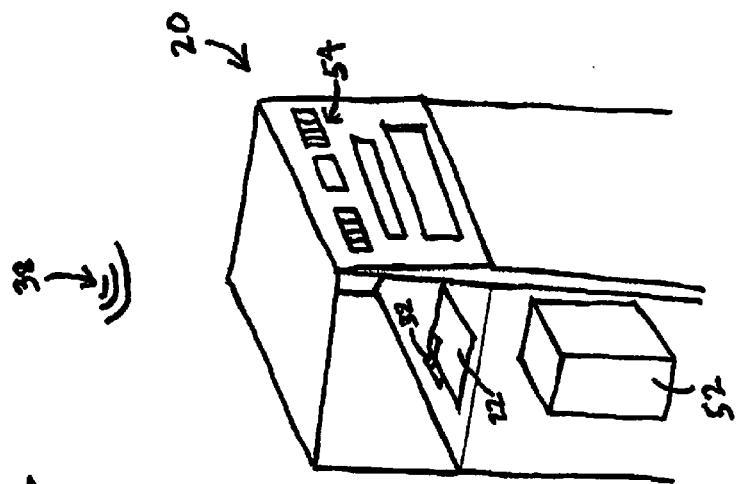
FIG. 5 is a partial perspective view of an exemplary pump in accordance with features of the invention.
Figure 6:
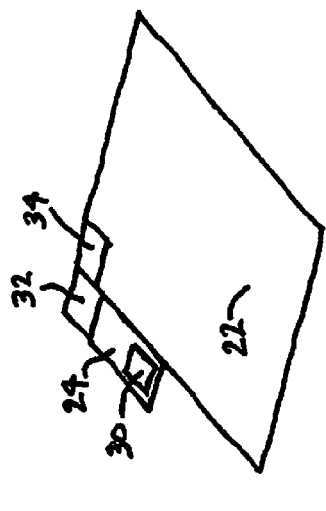
FIG. 6 is a perspective view of an exemplary component in accordance with feature of the invention.
Figure 7:
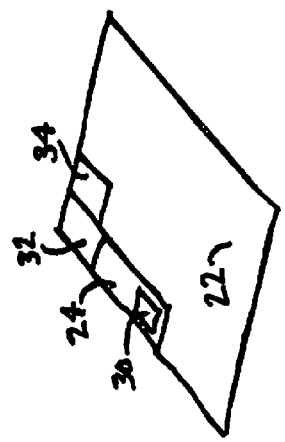
FIG. 7 is a perspective view of an exemplary component in accordance with features of the invention.

Component 24 may be positioned at an external portion of pump 20 or may be included within pump 20 or within a housing of pump 20 as desired. FIGS. 5-7 depict various aspects or arrangements of component 24 and controller 22. It may be appreciated that such arrangements are examples of the type of arrangements that may be used for equipping pump 20 with a feature of having a unique calling number. It may be appreciated that additional arrangements are possible.

FIG. 5 shows motherboard or controller 22 positioned within pump 20. It may be appreciated that electrical connections may exist between controller 22 and meter/valve units 52 and displays 54, and other components of a standard fuel pump. It may be appreciated that all of the elements of cellular phone component 24 may be included with the elements of controller 22.

Component 24 may include, for example, cellular signal receiver 32 configured to receive wireless cellular signals. Receiver 32 may also be directly associated with controller 22 as desired. Receiver 32 may include a cellular antennae or the like, and receives a cellular signal, such as a control signal 38, and passes the signal (through an electrical connection) to a cell phone signal interface 34 (see for, example, FIG. 3) which converts the cellular signal to an electrical signal appropriate for feeding or sending to a circuit or circuitry within controller 22. The control signal 38 and electrical signal includes or represents data/information used to operate controller 22 as desired. Interface 34 may be positioned within controller 22 or within component 24, for example. Interface 34 may include integrated circuits, programmable logic or other electrical elements in order to effectively convert cellular signal to electrical signals for controller 22.

Control signals 38 are cellular signals that are received by receiver 32 and component 24. Control signals 38 may include, for example a text message which includes or represents data/information used to control controller 22. The text message may be encrypted as desired. In one example the control signal 38 represents a pre-authorized value/volume of fuel to be dispensed. The value may be expressed or represented in an amount of currency, in an amount of pre-paid minutes, in an amount of credit or debit, or other amount, and the volume amount may be expressed in various units, for example liters, gallons, etc., which may also represent a monetary value. The value may be expressed in the form of a digital signal, for instance. Controller 22 may be programmed to cause fuel pump 20 to cease pumping fuel upon dispensing the pre-authorized value/volume of fuel. Signal 38 may contain information relating to the pre-authorized value/volume of fuel to accommodate automatic shut-off of pump dispensing.

In one example, control signals 38 are generated and broadcast on a cellular telephone system or cellular network. A cellular network or mobile network is a radio network distributed over land areas called cells, each cell served by at least one fixed-location transceiver, known as a cell site or base station. In a cellular network, each cell uses a different set of frequencies from neighboring cells, to avoid interference and provide bandwidth within each cell. The control signals 38 may be transmitted by or through a cellular phone system provider 40. Provider 40 may be a network of providers or sub-providers and may include a cellular phone company that includes customers as account subscribers. In another aspect a customer might not be an account subscriber but someone who simply purchases a cellular telephone that has a designated phone number and pre-paid minutes or credits. The information pertaining to a particular phone number, i.e., corresponding information such as account status, credits, pre-paid minutes, and other cellular telephone data may be retained in a database or network accessible by cellular phone system provider 40.

Provider 40 may utilize the cellular or mobile network to transmit signals and provide telecommunications. In one aspect, provider 40 may include the cellular or mobile network, together with the equipment, or portions of the equipment, to operate the same. In further aspects provider may subscribe to, contract from, or share with a third party for such equipment. In one aspect a provider 40 may include cellular transceivers, switching equipment and other communication devices used to provide cellular telephone services, and/or provider may subscribe or contract to use the same. Provider 40 may also include, or have access to, or use information from, a computing unit 42. A computing unit 42 may include any variety of computing means and components, and may include a computer or computers, a network, or other computing means. A computing unit 42 and provider 40 may also include a database 44 or databases. Database 44 may store information pertaining to a user telephone, a telephone account, including but not limited to credit items, usage data, pre-paid minutes or credits, debits, location information, and similar information. Computing unit 42 and/or database 44 may be accessible yet physically located at a position remote from provider 40.

Figure 4:
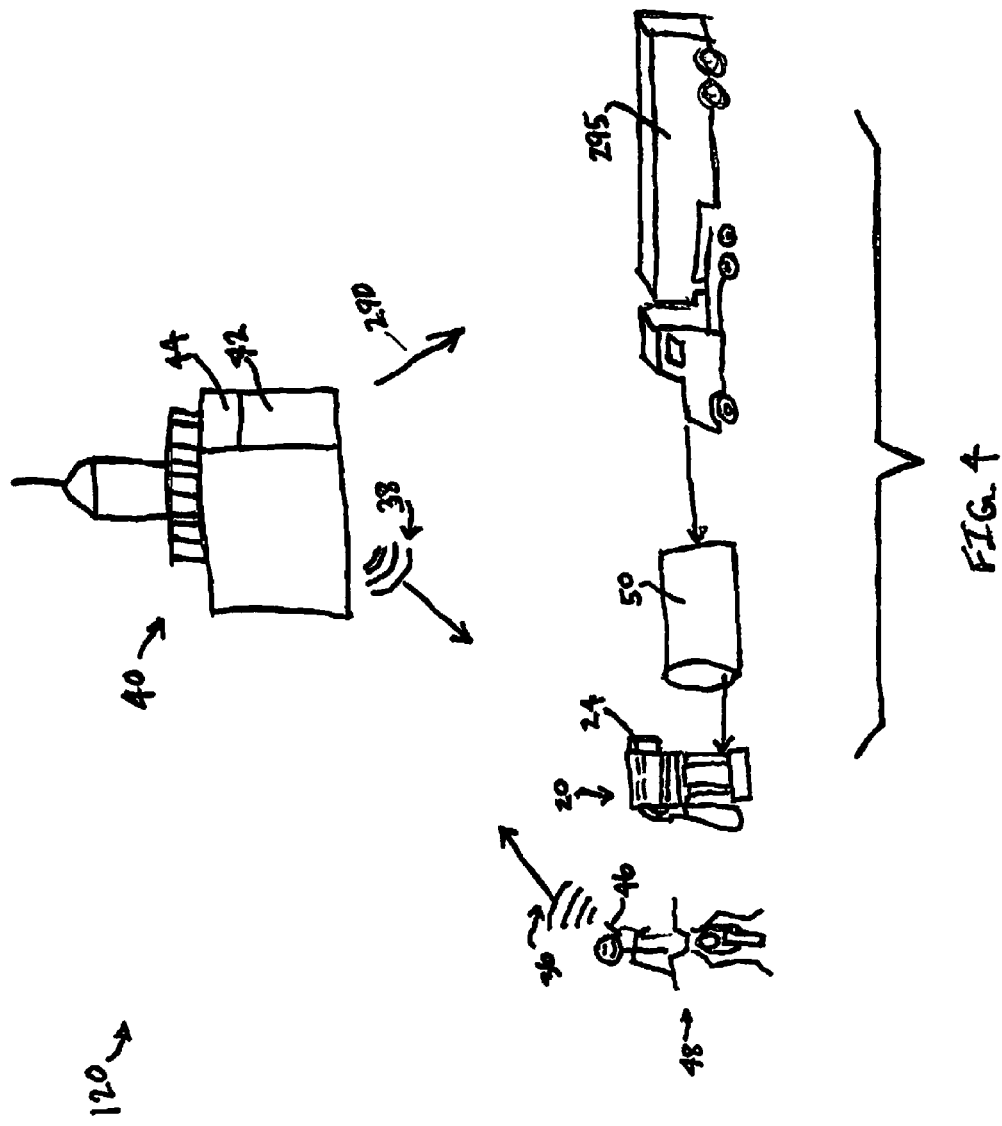
FIG. 4 is a schematic diagram of an exemplary pump and exemplary system and method that utilized the pump in accordance with an aspect of the present invention.

With reference to FIG. 4, a fuel dispensing system 120 is provided, for example. System 120 includes a provider 40 which receives information representing a requested defined value/volume of fuel, for instance. In one aspect, the information is transmitted to provider 40 via a request signal or request signals 36. Request signal 36 is transmitted by a cellular telephone 46 over the cellular or mobile network (in one aspect transmitted through at least one fixed-location transceiver and through at least one cell). In one aspect a fixed-location transceiver is part of a cellular or mobile telephone network which is utilized by consumers. Provider 40 is configured to authorize the sending of information representing the pre-authorized amount of fuel. The information is sent as a wireless cellular signal, and may include a control signal 38 or signals 38. Provider 40 may send signals 38 itself, or such signals may be authorized by provider 40 to be sent by a sub-provider or third-party.

Prior to sending cellular signal 38, or authorizing the sending of signal 38, provider 40 may verify (or have verified) the requested transaction. Verification may include, for example, comparing data associated with the cellular telephone 46 with account information relating to telephone 46. Such account information may be retained by provider 40 or third party. Such information may include, for example, an amount of pre-paid minutes, credits, debits, payment data and information and other information relating to a cellular telephone 46 or an account related to the telephone 46. When request signals 36 are sent from telephone 46, the unique calling number of telephone 46 is associated with signals 36. Authorization is accomplished in part by authenticating the unique calling number associated with telephone 46 and confirming that payment can be or is made. Authorization may be made through use of computing unit 42 which may or may not reference database 44, for example. A PIN number or security code or other authentication means may also be used in conjunction with the authorization noted herein. When authorization is achieved, a signal, such as control signal 38, representing a pre-authorized amount of fuel to be dispensed, may be transmitted. Signal 38 is received by receiver 32 of cellular phone component 24, for example, and is automatically presented to controller 22 which in turn controls pump 20. In such manner a customer, such as customer 48, or other person using telephone 46 may request dispensing of fuel of a defined value/volume. Such request is represented in one example as a digital cellular signal 36 received by provider 40. Thereafter, upon authorization, the defined value/volume represented as a digital cellular signal 38 is received by pump 20 to dispense the designated fuel. In one example signal 38 is a text message.

In a further aspect, system 120 may include at least an additional fuel pump 20, and in further aspects a plurality of fuel pumps 20 may be utilized. In such aspect, each fuel pump 120 may include a cellular phone component 24 having a unique calling number. The separate cellular phone component 24 is electrically connected to a respective controller 22 of the various pumps 20.

Figure 8:
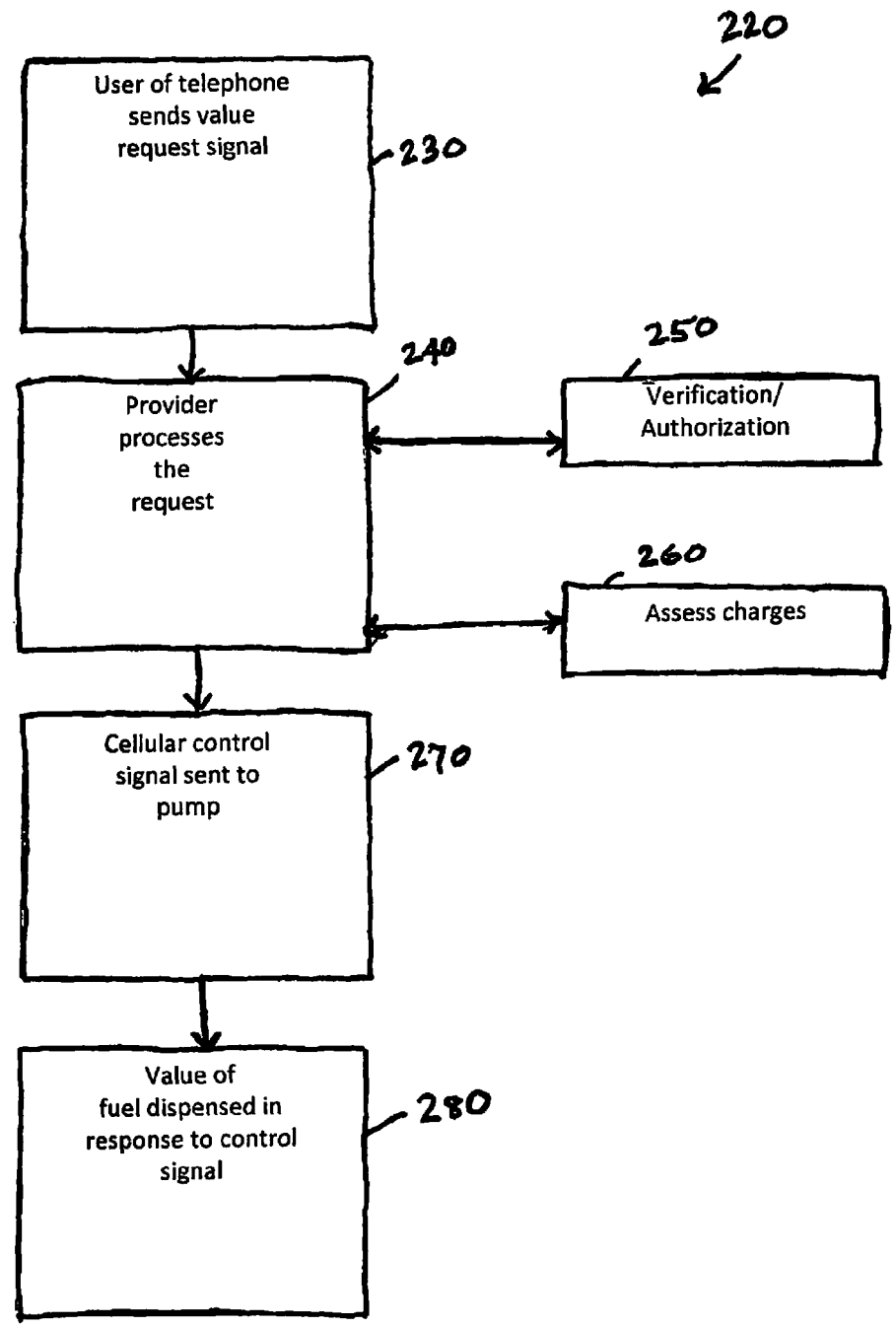
FIG. 8 illustrates a flow diagram of a method associated with sending of a cellular telephone signal to a unique telephone number associated with a fuel pump.

Further method aspects may be seen with reference to FIGS. 1-7 and also as illustrated in FIG. 8. One method 220 includes facilitating the purchase of fuel by a user 48 of a cellular telephone 46. Step 230 includes a user 48 initiating a fuel purchase request, for instance by using a cellular telephone, of a defined value/volume of fuel. The request may include a pump number or other designation associated with the particular pump from which fuel will be dispensed. The request is transmitted as request signal 36. The signal may be a text message or other electronic message. At step 240 provider 40 processes the request. In one instance provider 40 may receive the request and then process the request, in other instances provider may receive the request from a sub-provider or third party. For example, the request may be received by a cellular signal receiver which in turn forwards the request to provider 40. Provider 40 or sub-provider or third party may undertake step 250 verification or authorization of the request. At such step 250 a pin or other authorization means may be used to compare with data.

Step 260 includes assessing a charge to the cellular telephone 46 (or to an account associated with the telephone 46, or with a user associated with such telephone or account). Assessing a charge 260 may include billing a user account associated with the cellular telephone (or the unique calling number of the telephone). Assessing a charge 260 may also include debiting pre-paid minutes associated with the cellular telephone or associated with an account related to the cellular telephone and/or unique calling number. Assessing a charge 260 may also include reducing credits or billing an account or other techniques of assessing a charge or receiving payment. In one instance the amount charged at step 260 is in an amount greater than the value/volume of fuel to be dispensed, such as an enhanced charge. In this way a services fee or additional revenue is received by provider 40 (or by sub-provider and/or third party) for the service of facilitating the purchase of fuel. A portion of the enhanced charge may be shared between a cellular telephone service provider associated with the cellular telephone 46, for instance, and a cellular telephone service provider associated with the unique telephone number associated with the pump 20.

Step 270 includes a cellular control signal 38 sent to pump 20. Signal 38 may be sent by provider 40 and/or sub-provider and/or a third party. In one example signal 38 is an encrypted text message. Signal 38 may be of other variety of wireless signal. Signal 38 may be received by cellular phone component 24. Step 280 includes dispensing fuel of the defined value in response to receiving control signal 38. In one example the control signal 38 automatically controls pump 20 in order to dispense fuel (upon a user grasping a handle of a hose nozzle) and to automatically shut-off dispensing of fuel.

It may be appreciated that system 120 may include multiple pumps 20 where each pump 20 includes a unique calling number as noted herein. Multiple pumps 20 may dispense different types of fuel and may also charge different prices for the same fuels or for different fuels. It is not uncommon for the price of fuel to change frequently. One aspect of system 120 allows for convenient purchase or sale of fuel regardless of the type of fuel or the price associated with the fuel in any given pump 20. Such system may also avoid use of complicated means such as computers and databases used to keep track of which of the numerous pumps 20 contain a particular fuel or have a particular price of fuel. Instead, an in one example, the purchase of fuel is based on the value of minutes associated with the control signal 38. In such case a cell phone company or provider 40 need not know the price or type of fuel that is being dispensed at any particular pump 20 (and thus the cell phone company or provider 40 does not have to track such data). Instead the cell phone company or provider 40 simply tracks the debited minutes associated with cellular telephone 46.

It may be appreciated that a user 48 may obtain relatively cheap or inexpensive minutes that are then used to purchase fuel. In some cases where a user can obtain inexpensive minutes, the user can dispense fuel for a relatively lower cost. A user 48 may also accumulate minutes for fuel purchases. It may be appreciated that a pump owner or station proprietor may adjust prices independently and at various times. The pump 20 and system 120 accommodate such flexibility and may do so without any special database or tracking. A proprietor may display a value of fuel at pump 20 by associating a particular amount of telephone minutes. In one example a certain or defined amount of minutes may result in dispensing a certain or defined amount of fuel.

While a value associated with signals may be expressed in terms of telephone minutes, in other aspects values may be expressed in terms of currency, price, volume or other criteria.

Step 290, as generally represented by the arrow 290 in FIG. 4, includes paying a fuel supplier associated with the fuel to be dispensed an amount corresponding to the value of fuel to be dispensed. It may be appreciated that the step of assessing a charge occurs prior to step 270 where a cellular control signal is sent to pump 20. In such case the value of fuel to be dispensed is already paid even if the dispensing should fail. A step or mechanism may be utilized for resolving failed fueling and/or crediting of an account or reversing assessment 260 as needed. In further aspects more than one pump 20 may be configured with a cellular phone component 24 and unique calling number to accommodate fueling at multiple pumps and to further facilitate the purchase of fuel. As shown in FIG. 4 a fuel company represented as a fuel supplier 295 may include a truck that delivers the fuel to a tank 50. Tank 50 may be an above-ground tank 50 or may be positioned below ground or at other location.

In operation a user 48 may enter a telephone number corresponding to fuel system 120 and transmit the request signals to the designated telephone number. In addition or alternatively, user 48 may also use a telephone computer application program which facilitates communication with system 120. A phone application software component may assist user with the input of information that is transmitted to provider 40. Information may be wirelessly transmitted to provider 40 by user 48 to initiate fueling. Cellular telephone 46 may be pre-programmed with user preferences, codes, security, telephone numbers, etc., in order to streamline and secure a request or fuel purchase. A pump identification number may be included in the request signal.

Fuel pump 20 and system 120 work well, for example, in areas where electricity is scarce or unavailable, and also allow for a pumping solution and payment system that avoids the expensive and complicated controls of traditional systems. Pump 20 need not be equipped with expensive devices such as card readers/scanners or computers (or even connected/wired to a local computer or pump controller). Instead, an inexpensive cellular telephone component (or cellular telephone) is connected to a standard pump and configured to operate pump 20 as described herein. Pump 20 may also be associated with a battery powered fuel system or system that runs on solar or alternative power (and also with above-ground and portable tanks) so that pump and tank 50 may be positioned in remote areas and/or in areas where traditional fueling stations cannot.

In further aspects the assessment step 260 may instead comprise authorizing the assessment of charges where a third-party undertakes the actual assessment and tracking of the charges. In one aspect the step includes authorizing the debiting of minutes from a pre-paid account. In one aspect the debiting occurs in an amount corresponding to the value of fuel associated with the cellular telephone signal request. In a further aspect the debiting minutes from the pre-paid account or charging an account is in an amount that is greater than the value of fuel represented in the wireless cellular telephone signal sent to the fuel pump. The amount debited may represent an amount greater than the value corresponding to the value/volume of fuel actually dispensed. In further aspect the payment step 290 to a fuel company (such as a fuel supplier, distributor, transporter, middle-man, refiner, broker, or other type of fuel-related business) comprises payment to the fuel company in an amount corresponding to the value/volume of fuel dispensed. In a further aspect the payment step 290 to a fuel company comprises an amount less than the amount corresponding to the value of fuel dispensed.

In a further aspect, a standard fuel pump may be retrofitted with cellular phone component 24. In such case the previous pump will then operate as pump 20, capable of receiving a cellular control signal 38 to control dispensing of fuel. In such case the standard pump is allowed to operate to process payments as it normally does while also having the payment facilitation and convenience as described herein. In such case an operator or owner of the pump or related station may also realize a benefit when avoiding and/or reducing service charges associated with a credit card or debit card transactions.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular CELLULAR FUEL PUMP, SYSTEMS AND METHODS OF FUELING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:
1. A fuel pump comprising:
a controller positioned within said fuel pump and configured to control dispensing of fuel from said fuel pump; and a cellular phone component positioned on or within said fuel pump and electrically connected to said controller and configured to receive a control signal in the form of a wireless cellular telephone signal pertaining to a value or volume of fuel to be dispensed authorized by a cellular telephone provider where the signal relates to a value pertaining to a cellular telephone account of a cellular telephone provider, said phone component comprising a SIM card.

2. The fuel pump of claim 1 where said cellular phone component further comprises a cellular signal receiver and a cell phone interface configured to convert cellular telephone electrical text message signals into fuel pump electrical signals.

3. The fuel pump of claim 1 where said cellular phone component is configured to receive an encrypted text message, said controller configured to cause said fuel pump to dispense fuel upon receipt of the text message, the text message represents a pre-authorized value or volume of fuel, said controller configured to cause said fuel pump to cease pumping fuel upon dispensing the pre-authorized amount of fuel.

4. The fuel pump of claim 3 where said cellular phone component is contained within said controller.

5. The fuel pump of claim 1 where said controller interfaces with payment systems to dispense fuel in addition to interfacing with said cellular phone component.

6. The fuel pump of claim 1 where the signal relates to an authorized payment value from the cellular telephone account of the cellular telephone provider associated with a cellular telephone of a user.

7. The fuel pump of claim 6 where the payment value is associated with an amount associated with the cellular telephone account, the amount being from the group of minutes, pre-paid minutes, credits, debits, account billing, telephone bill charges, currency, dispensable volume, price.

8. The fuel pump of claim 1 where the signal corresponds to an amount or value of fuel to be dispensed from said pump and corresponding to a payment value charged to the cellular telephone account of the cellular telephone provider.

9. The fuel pump of claim 8 where the cellular telephone account of the cellular telephone provider includes a user telephone number having associated pre-paid minutes or credits.

10. The fuel pump of claim 1 further comprising a non-displayed unique calling number associated with said phone component, the control signal being a text message sent directly from the cellular telephone provider to the cellular phone component, the cellular telephone account associated with the cellular telephone provider from which the control signal is received by said phone component.

11. The fuel pump of claim 1 configured such that the signal is authorized by the provider to be sent by a third-party.

12. A fuel dispensing system comprising:
a cellular phone system provider configured to receive a message generated from a user containing information representing a requested defined value or volume of fuel to be dispensed, and configured to authorize a value or volume of fuel to be dispensed and to send to a fuel pump a wireless cellular control signal pertaining to the authorized value or volume of fuel to be dispensed; and
a fuel pump comprising:
a controller positioned within said fuel pump and configured to control dispensing of fuel from said fuel pump; and
a cellular phone component positioned on or within said fuel pump and connected to said controller, said phone component configured to receive the wireless cellular control signal from said cellular phone system provider where the signal relates to a value pertaining to a cellular telephone account of a cellular telephone provider.

13. The system of claim 12 where said cellular phone system provider includes a computing unit configured to process the fuel request, said fuel pump positioned at least one cellular cell away from said computing unit.

14. The system of claim 13 where said computing unit authorizes sending of the wireless cellular signal representing a pre-authorized amount of fuel to be dispensed, the signal being an encrypted text message.

15. The system of claim 12 where said cellular phone component comprises a cellular signal receiver, said cellular phone component configured to receive the signal representing a pre-authorized value or volume of fuel.

16. The system of claim 12 where said cellular phone system provider includes a database.

17. The fuel pump of claim 12 where said phone component includes a SIM card.

18. The fuel pump of claim 12 where said phone component is configured to receive the signal authorized by said provider directly from said provider.

19. A fuel dispensing system operable in response to transmission of a cellular telephone signal representing a requested defined value or volume of fuel, said system comprising:
a cellular phone system provider configured to receive information representing the requested defined value or volume of fuel, and configured to authorize a value or volume of fuel to be dispensed and to send information representing a pre-authorized amount of fuel to be dispensed as a wireless cellular signal; and
a fuel pump comprising:
a controller configured to control dispensing of fuel from said fuel pump; and
a cellular phone component connected to said controller, said phone component having a unique calling number and configured to receive the wireless cellular signal where the signal relates to a value pertaining to a cellular telephone account of a cellular telephone provider,
said system further comprising at least an additional fuel pump comprising a controller configured to control dispensing of fuel from said additional fuel pump, and a cellular phone component connected to said controller, said phone component having a unique calling number.

20. A method of facilitating the purchase of fuel where fuel is dispensed from a fuel pump in response to a request generated by a user to a cellular telephone provider, said method of facilitating comprising:
assessing a charge to a cellular telephone account of a cellular telephone provider in an amount representing a value or volume of fuel to be dispensed; and
authorizing, by a cellular telephone provider, the value or volume of fuel to be dispensed and sending a control message in the form of a wireless cellular telephone signal from a cellular phone provider to the fuel pump, the control message to be received by a cellular phone component positioned on or within the fuel pump and electrically connected to a controller within the pump configured to control dispensing of fuel from the pump, the cellular phone component comprising a SIM card, the telephone signal representing a value or volume of fuel to be dispensed.

21. The method of claim 20 further comprising paying a fuel supplier associated with the fuel to be dispensed an amount corresponding to the value of fuel dispensed.

22. The method of claim 21 where the amount paid to the fuel supplier is an amount less than the amount corresponding to the value of fuel to dispensed.

23. The method of claim 20 where said assessing a charge is chosen from billing a user account associated with the cellular telephone provider and debiting pre-paid minutes or credits associated with a cellular telephone number having prepaid minutes or credits.

24. The method of claim 23 where the charge is in an amount greater than the value of the fuel to be dispensed.

25. The method of claim 24 where at least a portion of the charge is shared between a cellular telephone service provider associated with the cellular telephone account and a cellular telephone service provider associated with a unique telephone number associated with the pump.

26. The method of claim 20 further comprising sending the control message as a text message to the pump and dispensing fuel from the fuel pump.

27. The method of claim 20 where the control message is received by the cellular phone component directly from the cellular phone provider.

28. The method of claim 27 where fuel is dispensed prior to any authentication notification to a cellular telephone from which the request is generated by the user.

29. The method of claim 20 further comprising dispensing fuel from the pump while avoiding use of a computer server.

30. The method of claim 20 further comprising dispensing fuel from the pump while avoiding the tracking of a price of fuel or a type of fuel at the pump.

31. The method of claim 20 further comprising dispensing fuel from the pump where the provider which authorizes the value or volume to be dispensed avoids the tracking of a price of fuel or a type of fuel at the pump.

* * * * *